Dec. 7, 1943.                G. B. WARREN                 2,336,323
          SEALING ARRANGEMENT FOR ELASTIC FLUID TURBINES AND THE LIKE
                          Filed March 12, 1942
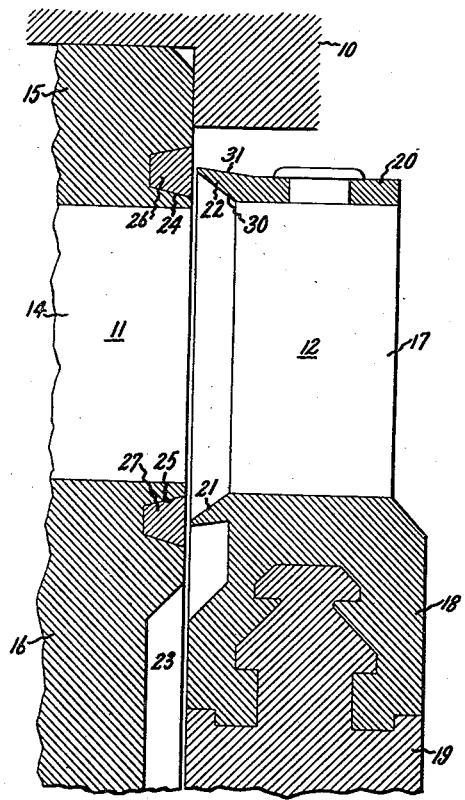
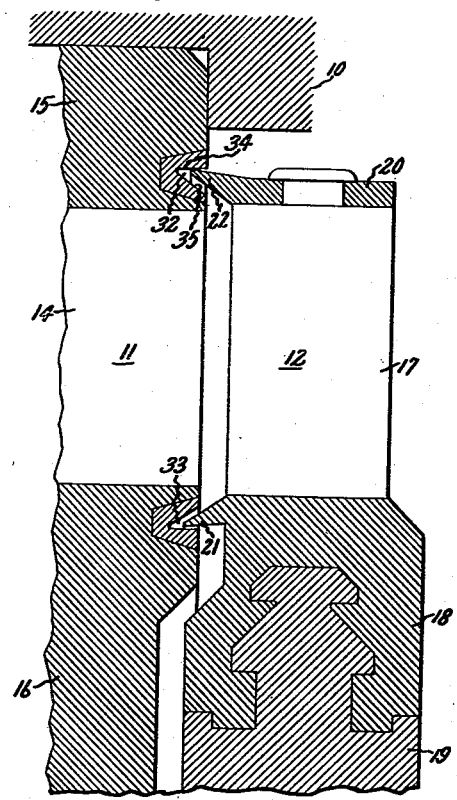
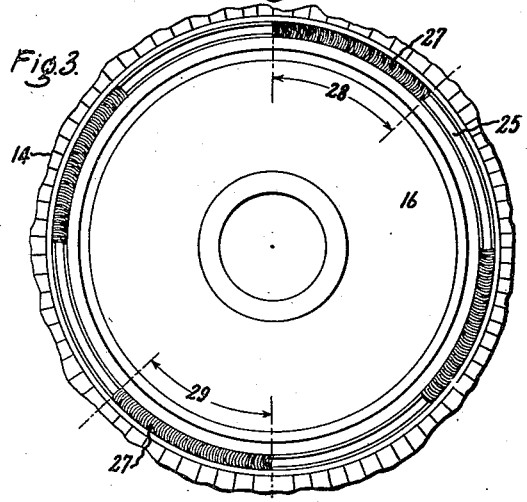
Inventor:
Glenn B. Warren,
by Harry E. Dunham
His Attorney.

Patented Dec. 7, 1943

2,336,323

UNITED STATES PATENT OFFICE 2,336,323

SEALING ARRANGEMENT FOR ELASTIC FLUID TURBINES AND THE LIKE

Glenn B. Warren, Niskayuna, N. Y., assignor to General Electric Company, a corporation of New York Application March 12, 1942, Serial No. 434,362

3 Claims. (Cl. 253—77)

The present invention relates to sealing arrangements for elastic fluid turbines and the like, more particularly to the kind of arrangements for sealing rotatable bucket wheels to stationary diaphragms or nozzle members and comprising annular sealing edges or projections formed at the inner and outer portions of one of the members and in cooperating relation with the other. With such sealing arrangements leakage of fluid into and from the space between co-operating diaphragms and bucket wheels is reduced and turbine efficiency accordingly increased.

Ordinarily the shroud band connecting the outer ends of the buckets and the outer portions of the bucket wheel disk are provided with annular projections forming a narrow clearance with adjacent inner and outer portions respectively of the diaphragm or nozzle plate. In order to reduce rubbing of the sealing projections it is customary normally to set up these edges so as to form a clearance of from 30 to 100 mils between the edges and the adjacent face of the diaphragm, the clearance depending upon the closeness of the particular stage to the thrust bearing, the general expansion characteristics and operating conditions of the turbine. In case rubbing of the sealing edges of the bucket wheel on the sealing surfaces of the diaphragm occurs, the amount of material thereby worn off these parts should not generate a harmful amount of heat. With present arrangements there is a tendency of the sealing edges or spill strips of the buckets to rub on the diaphragm or nozzle member. The metal thus worn off may build up or fuse to a single spot on the diaphragm, thus acting upon subsequent operation like a cutting tool cutting off the entire spill strip or sealing edge or edges of the bucket wheel, leading to a considerable increase in clearance and loss in turbine efficiency.

The object of my invention is to provide an improved construction of sealing arrangements of the kind aforementioned and method of making same whereby the said difficulties are substantially eliminated and a uniform seal is attained during varying operating conditions over a long period of time. This is accomplished in accordance with my invention by the provision of a sealing surface or surfaces on the diaphragm or nozzle member, which surface is formed by a comparatively soft material held in an annular groove or grooves of the diaphragm or nozzle member. In a preferred embodiment the diaphragm has annular grooves near the inner and outer ends of the diaphragm partitions filled with a soft material by means of a welding method.

For a better understanding of what I believe to be novel and my invention, attention is directed to the following description and the claims appended thereto in connection with the accompanying drawing.

In the drawing, Fig. 1 illustrates a sealing arrangement embodying my invention; Fig. 2 shows the arrangement of Fig. 1 after it has been operated for some time, and Fig. 3 illustrates the arrangement of Fig. 1 during the process of manufacture.

The drawing illustrates an elastic fluid turbine with a casing 10, a stationary diaphragm or nozzle member 11 suitably supported on the casing and a rotatable bucket wheel 12 for receiving elastic fluid from the diaphragm. The diaphragm has a plurality of circumferentially spaced partitions 14 forming nozzle passages between them for directing elastic fluid towards the bucket wheel. The outer ends of the partitions are secured to and supported on a ring 15 and the inner ends of the partitions are secured to a disk 16. During manufacture of such diaphragm the partitions 14 are secured to inner and outer bands which subsequently are fused to an outer ring and an inner disk respectively as more fully described, for example, in the patent to H. A. Lacey 1,932,278, issued October 24, 1933. Upon completion of the diaphragm said inner and outer bands are integrally united with and form parts of the inner disk 16 and the outer ring 15 respectively.

The bucket wheel 12 has a plurality of circumferentially spaced buckets 17 with bases 18 secured by a dovetail connection to a disk 19. The outer ends of the buckets 17 are connected by a shroud band 20. Portions of the bucket wheel near the inner and outer ends of the buckets are formed with annular projections 21 and 22 respectively which have sealing edges in cooperative relation with the adjacent face of the diaphragm 11. These edges, projections or spill strips, as they are sometimes termed, are made of steel, that is, the same material as the bucket bases. The outer strip 22 reduces leakage of fluid discharged from the nozzle passages around the outer tips of the buckets and the inner strip 21 reduces leakage of fluid from a higher to a lower stage, i. e. around the inner portion of the diaphragm disk 16 through the space 23 between the diaphragm and the bucket into the passages formed between adjacent buckets 17 of the wheel 12.

In order to cause minimum wear of the sealing strips during operation and to assure constant sealing action over a long period of operation I provide in accordance with my invention special sealing surfaces formed by comparatively soft metal. In the present example the ring 15 of the diaphragm is formed with an annular groove 24 and an outer portion of the disk 16 is formed with a similar annular groove 25. These grooves are filled with sealing strips 26 and 27 respectively. Any one of a number of soft alloys may be used for this purpose, for example, brass composed of about 60 to 63% copper, 33 to 37% zinc, 2.5 to 3.75% lead and up to .15% iron or solder comprising about 38% copper, 32% zinc and 30% silver. Good results have been obtained at turbine temperatures of the order of 800° F. with a sealing alloy known under the name of "BTH" metal and composed of about 61 to 69% by weight of copper, 12 to 18% zinc, 9 to 15% nickel, 4.5 to 7.5% lead and 1.25 to 3% tin.

The strips 26, 27 may be initially formed in segments and brazed or silver-soldered into the grooves 24 and 25. They may also be formed by a casting process, casting the desired molten metal directly into said grooves. It has been found that most of these methods, particularly the casting method, cause distortion of the diaphragm. Better results so far have been obtained by forming the strips 26, 27 by a welding process. To this end a welding rod is made of the proper material such as the aforementioned "BTH" alloy and the groove is gradually filled with this welding material by electric arc welding. To facilitate the complete filling of the grooves 24, 25 with welding material they are made V-shaped in section, that is, with a width decreasing with increasing depth. The least distortion of the diaphragm is caused by filling circumferentially spaced parts of the grooves 24, 25 alternately with welding material. Thus as indicated in Fig. 3, after the groove 24 has been filled over an arc 28, another arc 29 of the groove circumferentially spaced from the arc 28 may be filled with welding material until a continuous strip of sealing metal has been built up. This method causes the least amount of distortion. After the groove has been completely filled the face of the diaphragm adjacent the bucket wheel is machined to form a smooth sealing surface.

The sealing edges or spill strips 21, 22 are formed so as to assure substantially constant and uniform sealing engagement with the adjacent sealing surfaces of the diaphragm during varying load conditions causing varying axial movement of the turbine bucket wheel. More specifically, the sealing strip 21 is turned radially inward and the sealing strip 22 is turned radially outward. Both strips are annular and V-shaped in cross-section as has been the practice heretofore but these V-shaped portions are turned inward and outward respectively. From another viewpoint, each sealing strip has an inner conical surface 30 and an outer conical surface 31, both being inclined towards and converging towards the same side of the turbine. Thus the surface 30 is inclined toward the right and so is the surface 31. The inclination of the surface 31 is very slight. It is almost cylindrical and in certain instances cylindrical surfaces may be provided. The diameter of both surfaces at the edge of the strip 22 is a maximum and of the strip 21 a minimum.

During operation, axial thrusts and expansion of the turbine parts cause the sealing strips 21, 22 to rub against the sealing surfaces of the metal strips 26, 27 and thus gradually cut grooves 32, 33 (Fig. 2) into the latter. One surface 34 of each of these grooves is cylindrical and the other surface 35 of each groove is conical. The cylindrical surface 34 of each groove and the corresponding surface 31 of the sealing strips form a substantially constant seal which is not materially affected by axial movement of the rotor during varying operating conditions. This is a distinct advantage of my invention. With it, it is no longer necessary to provide minimum clearances of different sizes for different stages of a turbine. In fact, all the stages may be set up so that initial rubbing between the corresponding sealing strips and sealing surfaces occurs and grooves 32, 33 are worn into the sealing surfaces after a short period of operation.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. In an elastic fluid turbine, a bucket wheel member and a diaphragm member for conducting elastic fluid to the bucket wheel member, and a sealing arrangement to reduce leakage between said members comprising an annular steel projection formed on the face of one of the members and projecting towards the other member, said projection being essentially V-shaped with both surfaces of the V inclined in the same direction, the other member having a groove in one face filled with a soft alloy forming a sealing surface in cooperative relation with the projection.

2. In an elastic fluid turbine, a diaphragm having an outer ring member, an inner disk member and a plurality of circumferentially spaced buckets secured between said members, annular strips of a comparatively soft alloy secured to one face of said members and a bucket wheel comprising a plurality of spaced buckets each having a base and a shroud connecting the outer ends of the buckets, the shroud and the bucket bases having concentrically spaced projections in sealing relation with said strips, the projections being V-shaped in section with the two conical surfaces of each V-shaped projection inclined in the same direction towards the axis of rotation.

3. The combination with a stationary disk member and a rotatable disk member closely spaced with the stationary member of an arrangement sealing the stationary member to the rotatable disk member, said arrangement comprising an annular projection V-shaped in section projecting laterally from a side of the rotatable disk member and an annular sealing strip made of soft alloy fused into a V-shaped groove of the stationary member and forming a sealing surface in sealing relation to said projection, the two sides of the V-shaped annular projection being inclined in the same direction towards the axis of rotation.

GLENN B. WARREN.